US012033239B2

(12) United States Patent
Sharma et al.

(10) Patent No.: US 12,033,239 B2
(45) Date of Patent: Jul. 9, 2024

(54) DEAD SURFACE INVALIDATION

(71) Applicant: Advanced Micro Devices, Inc., Santa Clara, CA (US)

(72) Inventors: Priyadarshi Sharma, Santa Clara, CA (US); Anshuman Mittal, Santa Clara, CA (US); Saurabh Sharma, Santa Clara, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 102 days.

(21) Appl. No.: 17/563,950

(22) Filed: Dec. 28, 2021

(65) Prior Publication Data

US 2023/0206384 A1  Jun. 29, 2023

(51) Int. Cl.
*G06T 1/20* (2006.01)
*G06F 12/0891* (2016.01)
*G06T 1/60* (2006.01)

(52) U.S. Cl.
CPC ............ *G06T 1/60* (2013.01); *G06F 12/0891* (2013.01); *G06T 1/20* (2013.01); *G06F 2212/455* (2013.01)

(58) Field of Classification Search
CPC ......... G06T 1/20; G06T 1/60; G06F 12/0891; G06F 2212/455
USPC ....................................................... 345/557
See application file for complete search history.

(56) References Cited

U.S. PATENT DOCUMENTS

2018/0181491 A1* 6/2018 DeLaurier ............. G06F 12/084
2019/0370929 A1* 12/2019 Imbrogno ........... G06F 12/0891

OTHER PUBLICATIONS

Belady, L.A., "A study of replacement algorithms for a virtual-storage computer", IBM Systems Journal, Jun. 1966, pp. 78-101, vol. 5, Issue 2.
Jain et al., "Back to the Future: Leveraging Belady's Algorithm for Improved Cache Replacement", ISCA '16: Proceedings of the 43rd International Symposium on Computer Architecture, Jun. 2016, 12 pages.
Sartor et al., "Cooperative Cache Scrubbing", PACT '14: Proceedings of the 23rd International Conference on Parallel Architectures and Compilation, Aug. 24-27, 2014, 12 pages.

* cited by examiner

*Primary Examiner* — Jacinta M Crawford
(74) *Attorney, Agent, or Firm* — Kowert, Hood, Munyon, Rankin & Goetzel, P.C.; Rory D. Rankin

(57) ABSTRACT

Systems, apparatuses, and methods for performing dead surface invalidation are disclosed. An application sends draw call commands to a graphics processing unit (GPU) via a driver, with the draw call commands rendering to surfaces. After it is determined that a given surface will no longer be accessed by subsequent draw calls, the application sends a surface invalidation command for the given surface to a command processor of the GPU. After the command processor receives the surface invalidation command, the command processor waits for a shader engine to send a draw call completion message for a last draw call to access the given surface. Once the command processor receives the draw call completion message, the command processor sends a surface invalidation command to a cache to invalidate cache lines for the given surface to free up space in the cache for other data.

19 Claims, 10 Drawing Sheets

DEAD SURFACE INVALIDATION

BACKGROUND

Description of the Related Art

Three-dimensional (3-D) graphics are often processed using a graphics pipeline formed of a sequence of programmable shaders and fixed-function hardware blocks. For example, a 3-D model of an object that is visible in a frame can be represented by a set of triangles, other polygons, or patches which are processed in the graphics pipeline to produce values of pixels for display to a user. The triangles, other polygons, and patches are collectively referred to as primitives.

In a typical graphics pipeline, a sequence of work-items, which can also be referred to as threads, are processed so as to output a final result. Each processing element executes a respective instantiation of a particular work-item to process incoming data. A work-item is one of a collection of parallel executions of a kernel or shader invoked on a compute unit. A work-item is distinguished from other executions within the collection by a global ID and a local ID. Different types of data can be processed by work-items, including pixels, vertices, domain-points, threads, and the like. A compute unit includes a collection of processing elements (e.g., single-instruction, multiple-data (SIMD) units) that perform synchronous execution of a plurality of work-items. The number of processing elements per compute unit can vary from implementation to implementation. A subset of work-items in a workgroup that execute simultaneously together on a compute unit can be referred to as a wavefront, warp, or vector. The width of a wavefront is a characteristic of the hardware of the compute unit.

Graphics processing pipelines include a number of stages that perform individual tasks, such as transforming vertex positions and attributes, calculating pixel colors, and so on. These tasks are performed in parallel by parallel execution units on the individual work items of wavefronts traversing the pipeline. Graphics processing pipelines are constantly being updated and improved.

BRIEF DESCRIPTION OF THE DRAWINGS

The advantages of the methods and mechanisms described herein may be better understood by referring to the following description in conjunction with the accompanying drawings, in which.

DETAILED DESCRIPTION OF IMPLEMENTATIONS

In the following description, numerous specific details are set forth to provide a thorough understanding of the methods and mechanisms presented herein. However, one having ordinary skill in the art should recognize that the various implementations may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Various systems, apparatuses, and methods for performing dead surface invalidation are disclosed herein. In one implementation, a system includes a first processor and a second processor. The first processor executes an application and a driver which submit graphics work to the second processor for rendering surfaces. In one implementation, the application and driver on the first processor generate commands which facilitate the ability of the second processor to optimize the usage of its caches. For example, after a rendered surface is no longer needed, a discard surface command is sent to a command processor on the second processor to indicate that the surface can be flushed out of the caches. In one implementation, the application provides a discard surface command to the driver and the driver determines after which draw call to dispatch the discard command to the command processor as part of the command stream. In one implementation, each surface has a base address and a size, which is specified by the driver to the command processor.

In one implementation, in response to receiving a discard surface command, the command processor waits until after a particular draw call is completed before conveying an invalidate surface command for the corresponding surface (s) to one or more caches. In one implementation, a shader engine notifies the command processor when a particular draw call has been completed. In response to receiving the invalidate surface command, the cache(s) invalidate cache lines corresponding to the surface(s) without writing dirty data back to memory. This frees up cache space for other surfaces and helps to reduce the amount of memory traffic generated.

Figure 1:
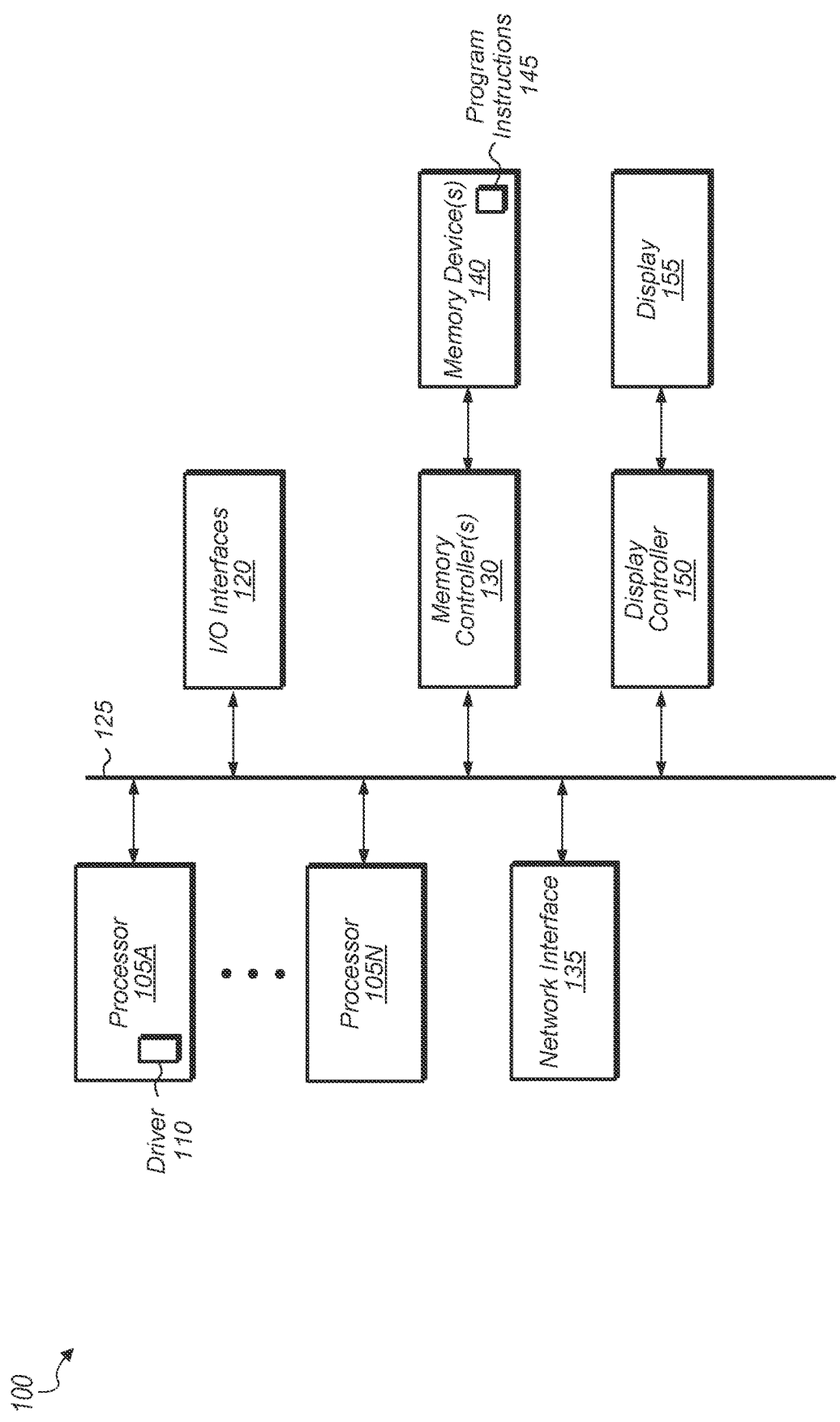
FIG. 1 is a block diagram of one implementation of a computing system.

Referring now to FIG. 1, a block diagram of one implementation of a computing system 100 is shown. In one implementation, computing system 100 includes at least processors 105A-N, input/output (I/O) interfaces 120, bus 125, memory controller(s) 130, network interface 135, memory device(s) 140, display controller 150, and display 155. In other implementations, computing system 100 includes other components and/or computing system 100 is arranged differently. Processors 105A-N are representative of any number of processors which are included in system 100.

In one implementation, processor 105A is a general purpose processor, such as a central processing unit (CPU).

In this implementation, processor 105A executes a driver 110 (e.g., graphics driver) for communicating with and/or controlling the operation of one or more of the other processors in system 100. In one implementation, processor 105N is a data parallel processor with a highly parallel architecture, such as a graphics processing unit (GPU) which processes data, executes parallel processing workloads, renders pixels for display controller 150 to drive to display 155, and/or executes other workloads.

GPUs can execute graphics-processing tasks required by an end-user application, such as a video-game application. GPUs are also increasingly being used to perform other tasks which are unrelated to graphics. Other data parallel processors that can be included in system 100 include digital signal processors (DSPs), field programmable gate arrays (FPGAs), application specific integrated circuits (ASICs), general purpose compute processors (GPGPUs), and so forth. In some implementations, processors 105A-N include multiple data parallel processors.

In some implementations, an application executing on processor 105A utilizes a graphics application programming interface (API) to invoke a user mode driver 110 (or a similar GPU driver). In one implementation, user mode driver 110 issues one or more commands to a GPU for rendering one or more graphics primitives into displayable graphics images. Based on the graphics instructions issued by the application to the user mode driver 110, the user mode driver 110 formulates one or more graphics commands that specify one or more operations for the GPU to perform for rendering graphics. In one implementation, the commands sent to the GPU include an invalidate surface command which causes the GPU to invalidate one or more surfaces that are stored in one or more caches. More details on the invalidate surface command are provided throughout the remainder of this disclosure. In some implementations, the user mode driver 110 is a part of an application running on a CPU. For example, the user mode driver 110 may be part of a gaming application running on the CPU. In one implementation, when driver 110 is a kernel mode driver, driver 110 is part of an operating system (OS) running on the CPU.

Memory controller(s) 130 are representative of any number and type of memory controllers accessible by processors 105A-N. While memory controller(s) 130 are shown as being separate from processors 105A-N, it should be understood that this merely represents one possible implementation. In other implementations, a memory controller 130 can be embedded within one or more of processors 105A-N and/or a memory controller 130 can be located on the same semiconductor die as one or more of processors 105A-N. Memory controller(s) 130 are coupled to any number and type of memory devices(s) 140.

Memory device(s) 140 are representative of any number and type of devices containing memory and/or storage elements. For example, the type of memory in memory device(s) 140 includes Dynamic Random Access Memory (DRAM), Static Random Access Memory (SRAM), NAND Flash memory, NOR flash memory, Ferroelectric Random Access Memory (FeRAM), or others. Memory device(s) 140 store program instructions 145, which can include any number of different sets of program instructions, such as a first set of program instructions for an application, a second set of program instructions for a driver component, and so on. Alternatively, program instructions 145, or a portion thereof, can be stored in a memory or cache device local to processor 105A and/or processor 105N.

I/O interfaces 120 are representative of any number and type of I/O interfaces (e.g., peripheral component interconnect (PCI) bus, PCI-Extended (PCI-X), PCIE (PCI Express) bus, gigabit Ethernet (GBE) bus, universal serial bus (USB)). Various types of peripheral devices (not shown) are coupled to I/O interfaces 120. Such peripheral devices include (but are not limited to) displays, keyboards, mice, printers, scanners, joysticks or other types of game controllers, media recording devices, external storage devices, and so forth. Network interface 135 is able to receive and send network messages across a network.

In various implementations, computing system 100 is a computer, laptop, mobile device, game console, server, streaming device, wearable device, or any of various other types of computing systems or devices. It is noted that the number of components of computing system 100 varies from implementation to implementation. For example, in other implementations, there are more or fewer of each component than the number shown in FIG. 1. It is also noted that in other implementations, computing system 100 includes other components not shown in FIG. 1. Additionally, in other implementations, computing system 100 is structured in other ways than shown in FIG. 1.

Figure 2:
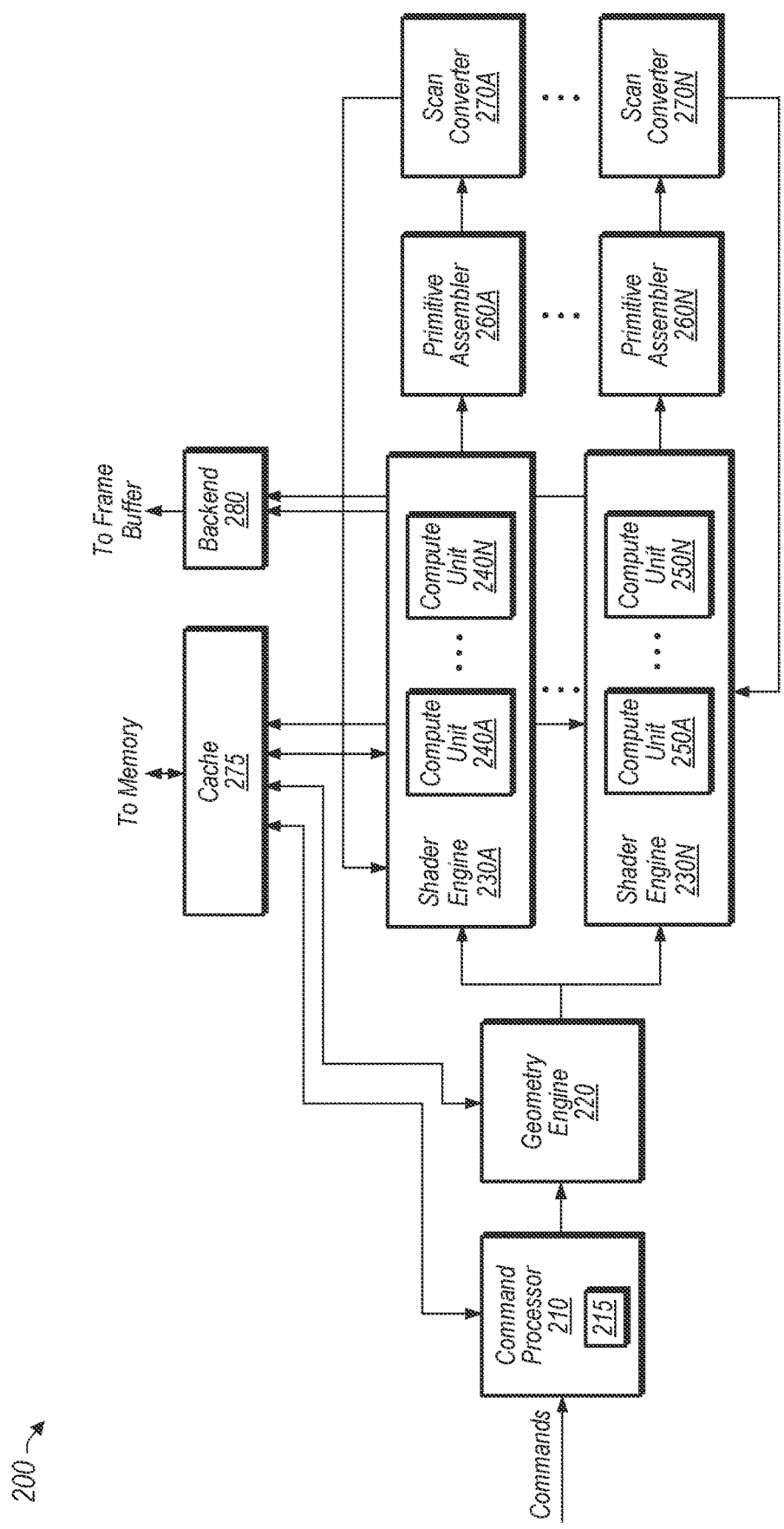
FIG. 2 is a block diagram of one implementation of a GPU.

Turning now to FIG. 2, a block diagram of one implementation of a GPU 200 is shown. In one implementation, command processor 210 processes commands received from a host processor (e.g., processor 105A of FIG. 1). Also, command processor 210 sets GPU 200 in the correct state to execute the received commands. In one implementation, the received commands are intended to cause GPU 200 to render various scenes of a video game application, movie, or other application. Based on commands received from command processor 210, geometry engine 220 processes indices according to the topology (e.g., points, lines, triangles) and connectivity of the scene being rendered. For example, in one implementation, geometry engine 220 processes a mesh based on quadrilateral primitives or triangle primitives that represent a three-dimensional (3D) object. In this example, geometry engine 220 reads vertices out of a buffer using fixed function operations, forming mesh geometry, and creating pipeline work items.

Geometry engine 220 is coupled to any number of shader engines 230A-N, with the number varying according to the implementation. Shader engines 230A-N include any number of compute units 240A-N and 250A-N, with shader engines 230A-N sharing compute units 240A-N in some implementations while in other implementations, each shader engine 230A-N has its own compute units. Shader engines 230A-N execute shader programs to process the wavefronts received from geometry engine 220. Depending on the implementation, a wavefront can include 32 work items, 64 work items, or some other number of work items. It is noted that the terms "work item" and "thread" can be used interchangeably herein.

In one implementation, the shader programs executed by shader engines 230A-N include at least a vertex shader and a hull shader that operate on high order primitives such as patches that represent a three-dimensional (3D) model of a scene. In this implementation, the vertex and/or hull shader provide the high order primitives to a shader which generates lower order primitives from the higher order primitives. The lower order primitives are then replicated, shaded, and/or sub-divided before being processed by pixel shaders. The pixel shaders perform culling, rasterization, depth testing, color blending, and the like on the primitives to generate fragments or pixels for display. In other implementations, other types and/or sequences of shaders are employed to process the various wavefronts traversing the pipeline.

Shader engines 230A-N read from and write to cache 275 during execution of the shader programs. For example, during draw calls, shader engines 230A-N write to surfaces which are cached in cache 275. At the end of a given draw call, a given shader engine 230A-N will send an end of draw call notification to command processor 210. If command processor 210 has received a surface discard command for a surface associated with the given draw call, command processor 210 will generate and convey an invalidation packet to cache 275 to invalidate any cache lines for the surface. This will allow the cache lines to be reused for other surfaces of subsequent draw calls, which improves cache residency and hit rates. Also, any dirty cache lines will not be written back to memory for these invalidated surfaces, which helps to reduce unnecessary memory traffic.

In one implementation, command processor 210 maintains mapping table 215 to map draw calls to surfaces. In this implementation, command processor 210 sets a flag for a given surface when an invalidation surface command specifying the given surface has been received. Then, at a later point in time, when an end of draw call notification for a given draw call is received, command processor 210 determines which surfaces correspond to the given draw call based on the mappings of draw calls to surfaces as indicated by table 215. If a particular surface associated with the given draw call has been flagged, then command processor 210 generates and conveys a surface invalidation command for the particular surface to cache 275. In another implementation, the surface invalidation command specifies an address range of the surface that should be invalidated. In this implementation, each entry in table 215 also includes a base address and size for the corresponding surface. Having this information in each entry of table 215 allows command processor 210 to specify to cache 275 an address range of a surface that should be invalidated. In response to receiving the surface invalidation command in this implementation, cache 275 will retrieve the address range from the command and then invalidate any cache lines within the specified address range. In this implementation, cache 275 is able to handle a ranged request in this fashion for any surface.

Shader engines 230A-N manage the outputs from the shader programs and forward the outputs either to the primitive assemblers 260A-N or the backend 280. For example, in one implementation, shader engines 230A-N export the positions of vertices after transformation. Primitive assemblers 260A-N accumulate and connect vertices that span primitives and pass the primitives to scan converters 270A-N which perform rasterization. Scan converters 270A-N determine which pixels are covered by the primitives and forward the pixel data to shader engines 230A-N which will then launch pixel shader wavefronts on corresponding compute units.

Figure 3:
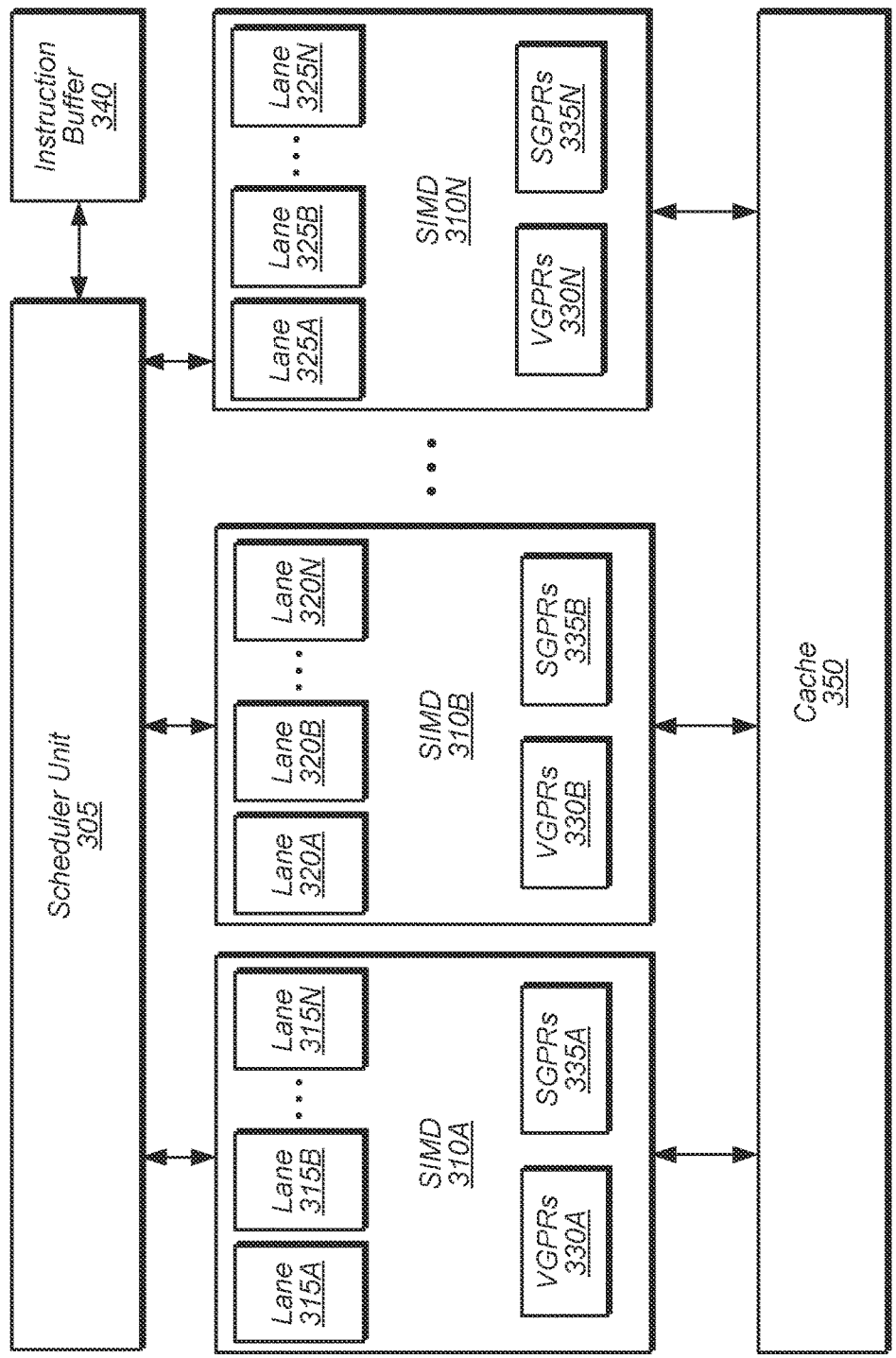
FIG. 3 is a block diagram of one implementation of a compute unit.

Referring now to FIG. 3, a block diagram of one implementation of a compute unit 300 is shown. In one implementation, compute unit 300 includes at least SIMDs 310A-N, scheduler unit 305, instruction buffer 340, and cache 350. It is noted that compute unit 300 can also include other components which are not shown in FIG. 3 to avoid obscuring the figure. In one implementation, compute units 240A-N and 250A-N (of FIG. 2) include the components of compute unit 300.

In one implementation, compute unit 300 executes instructions of a kernel or shader on any number of wavefronts. These instructions are stored in instruction buffer 340 and scheduled for execution on SIMDs 310A-N by scheduler unit 305. In one implementation, the width of a wavefront matches a number of lanes in lanes 315A-N, 320A-N, and 325A-N in SIMDs 310A-N. Each lane 315A-N, 320A-N, and 325A-N of SIMDs 310A-N can also be referred to as an "execution unit".

In one implementation, GPU 300 receives a plurality of instructions for a wavefront with a number of work-items. When work-items execute on SIMDs 310A-N, each work-item is assigned a corresponding portion of vector general purpose registers (VGPRs) 330A-N and scalar general purpose registers (SGPRs) 335A-N. It is noted that the letter "N" when displayed herein next to various structures is meant to generically indicate any number of elements for that structure (e.g., any number of SIMDs 310A-N). Additionally, different references within FIG. 3 that use the letter "N" (e.g., SIMDs 310A-N and lanes 315A-N) are not intended to indicate that equal numbers of the different elements are provided (e.g., the number of SIMDs 310A-N can differ from the number of lanes 315A-N).

Figure 4:
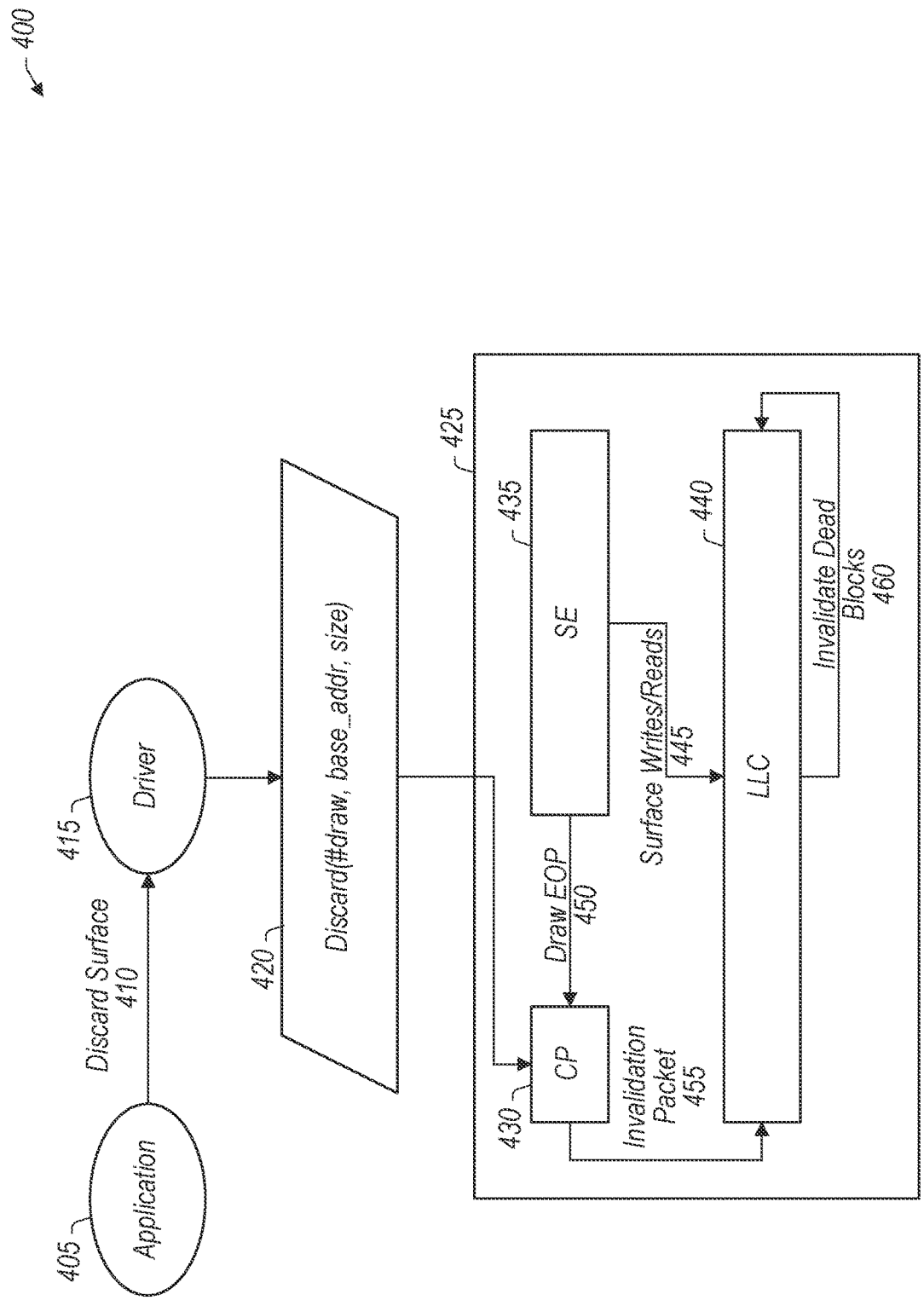
FIG. 4 is a block diagram of one implementation of a system for performing dead surface invalidation.

Turning now to FIG. 4, a block diagram of one implementation of a system 400 for performing dead surface invalidation is shown. In one implementation, system 400 includes application 405 which executes an instruction for sending a discard surface notification 410 to driver 415 for a given surface after the given surface is no longer needed by any subsequent draw calls. In one implementation, application 405 and driver 415 execute on a main processor (e.g., CPU) of system 400. In other implementations, application 405 and/or driver 415 execute on other types of processing units. In response to receiving discard surface notification 410, driver 415 sends a discard command 420 to command processor (CP) 430 of processor 425. In one implementation, processor 425 is a GPU. In other implementations, processor 425 is any of various other types of processors. In one implementation, the discard command 420 specifies a draw call identifier (ID), a base address, and a size of the surface to be discarded.

In one implementation, shader engine (SE) 435 performs any number of writes and reads 445 to the given surface as part of the corresponding draw call. In one implementation, at least a portion of the given surface is stored in last-level cache (LLC) 440. When SE 435 finishes a draw call, SE 435 sends a draw end of pipe (EOP) notification 450 to command processor 430. In one implementation, in response to receiving the draw EOP notification 450, command processor 430 sends an invalidation packet 455 to LLC 440 for the surface specified by discard command 420. When LLC 440 receives invalidation packet 455, LLC 440 invalidates the dead blocks 460 of the given surface. This allows the cache lines of the given surface to be overwritten by new data without the cache lines being written back to memory. This helps cache replacement to reuse these invalidated blocks to bring in new surfaces and thus improve cache residency and the overall hit-rate. This also helps to reduce the memory traffic on the memory bus.

Figure 5:
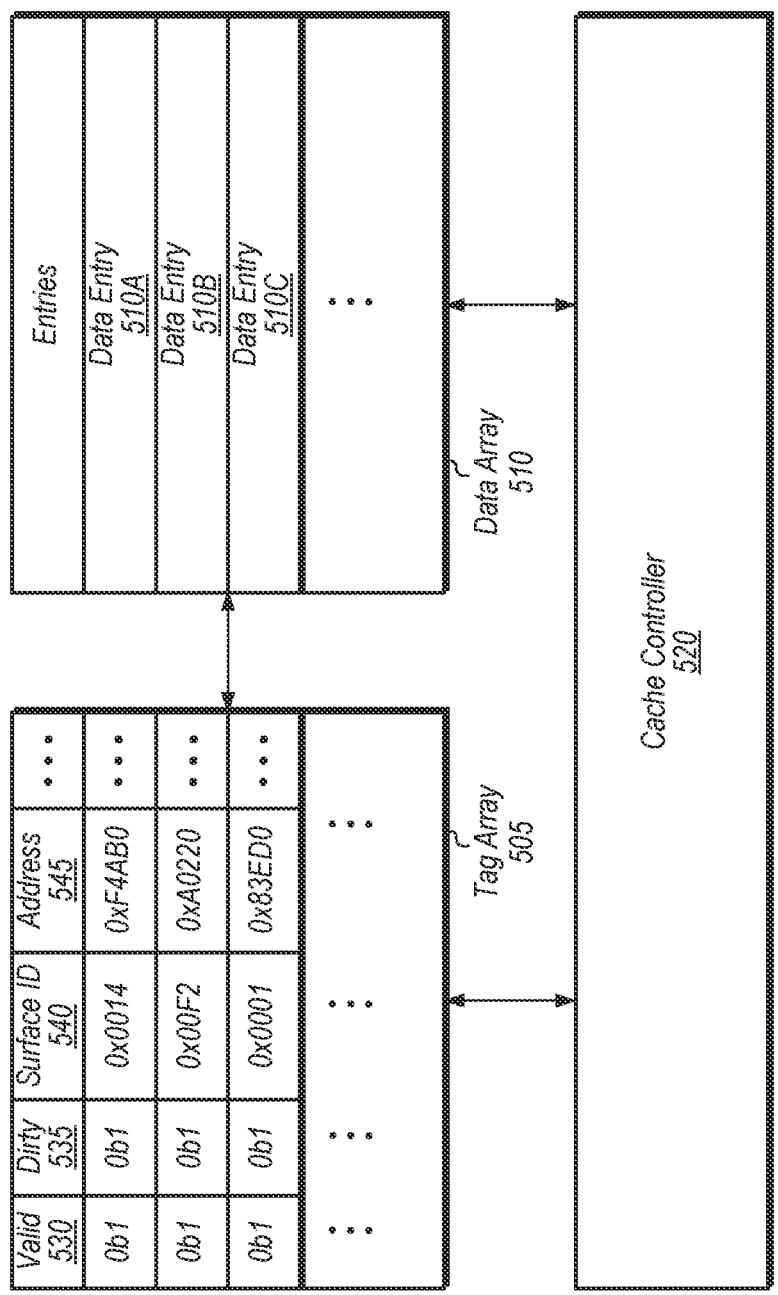
FIG. 5 is a block diagram of one implementation of a cache.

Turning now to FIG. 5, a block diagram of one implementation of a cache 500 is shown. In one implementation, cache 500 includes at least tag array 505, data array 510, and cache controller 520. Tag array 505 is representative of any number of separate tag arrays that are included in cache 500, even though only one tag array 505 is shown in FIG. 5. Similarly, data array 510 is representative of any number of separate data arrays of cache 500. It is noted that cache 500 can also include other components and/or cache 500 can be structured in other suitable manners in other implementations.

In one implementation, the tag entries in tag array 505 correspond to the data entries in data array 510. In other words, there is a one-to-one correspondence between tag array 505 entries and data array 510 entries in this implementation. In other implementations, cache 500 can maintain other relationships between tag entries in tag array 505 and data entries in data array 510. In one implementation, each entry in tag array 505 includes a valid field 530, dirty field 535, surface identifier (ID) field 540, address field 545, and any number of other fields.

In one implementation, when cache controller 520 receives an invalidation packet from a command processor, the cache controller retrieves a surface ID from the invalidation packet. Then, cache controller 520 searches through the entries of tag array 505 to find entries with this surface ID. These entries are then invalidated by having their valid fields 530 cleared. The invalidated entries can then be used for storing other data. In another implementation, cache controller 520 determines which cache lines to invalidate based on the addresses of the cache lines rather than their surface IDs. In this implementation, cache controller 520 determines which addresses to invalidate based on a surface base address and surface size received with the invalidation packet. It is noted that if the line is dirty as indicated by dirty field 535, the line is not written back to memory when cache controller 520 finds a matching entry for a surface being invalidated. This helps to prevent unnecessary memory traffic.

Figure 6:
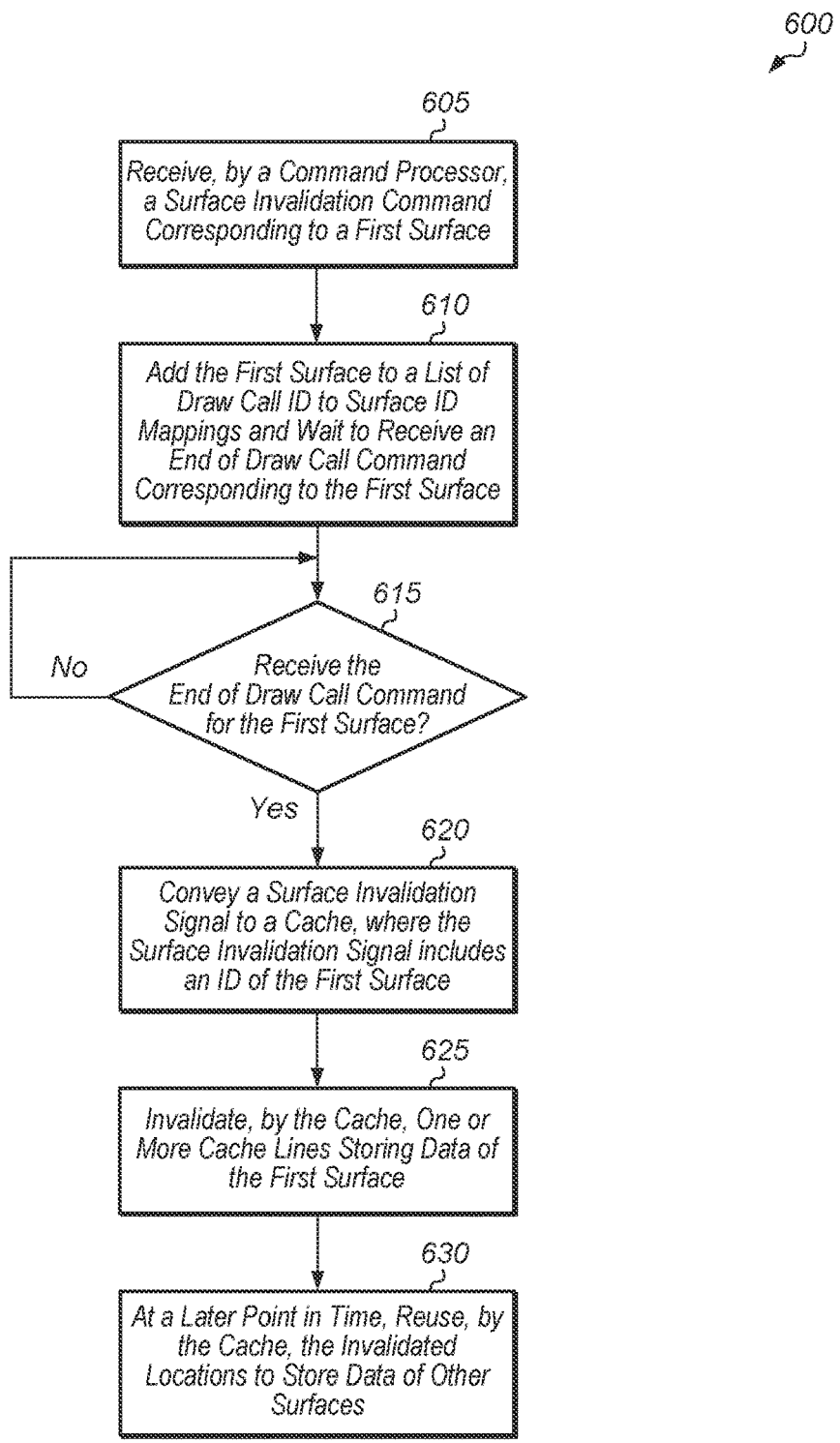
FIG. 6 is a generalized flow diagram illustrating one implementation of a method for invalidating dead surfaces.
Figure 7:
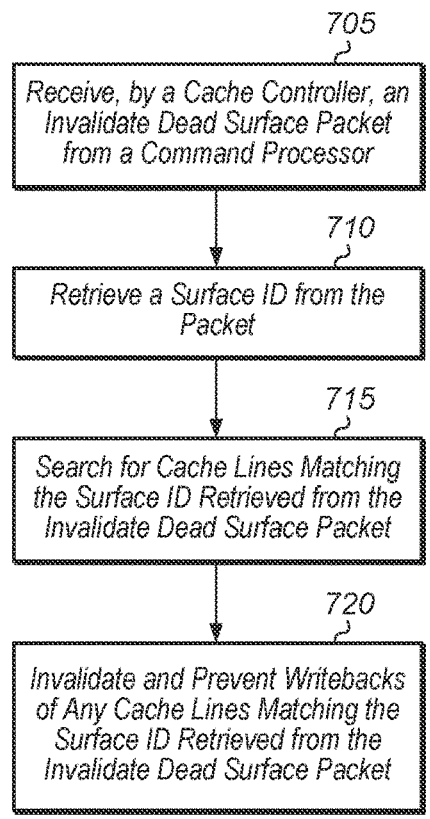
FIG. 7 is a generalized flow diagram illustrating one implementation of a method for a cache controller processing an invalidate dead surface packet.
Figure 8:
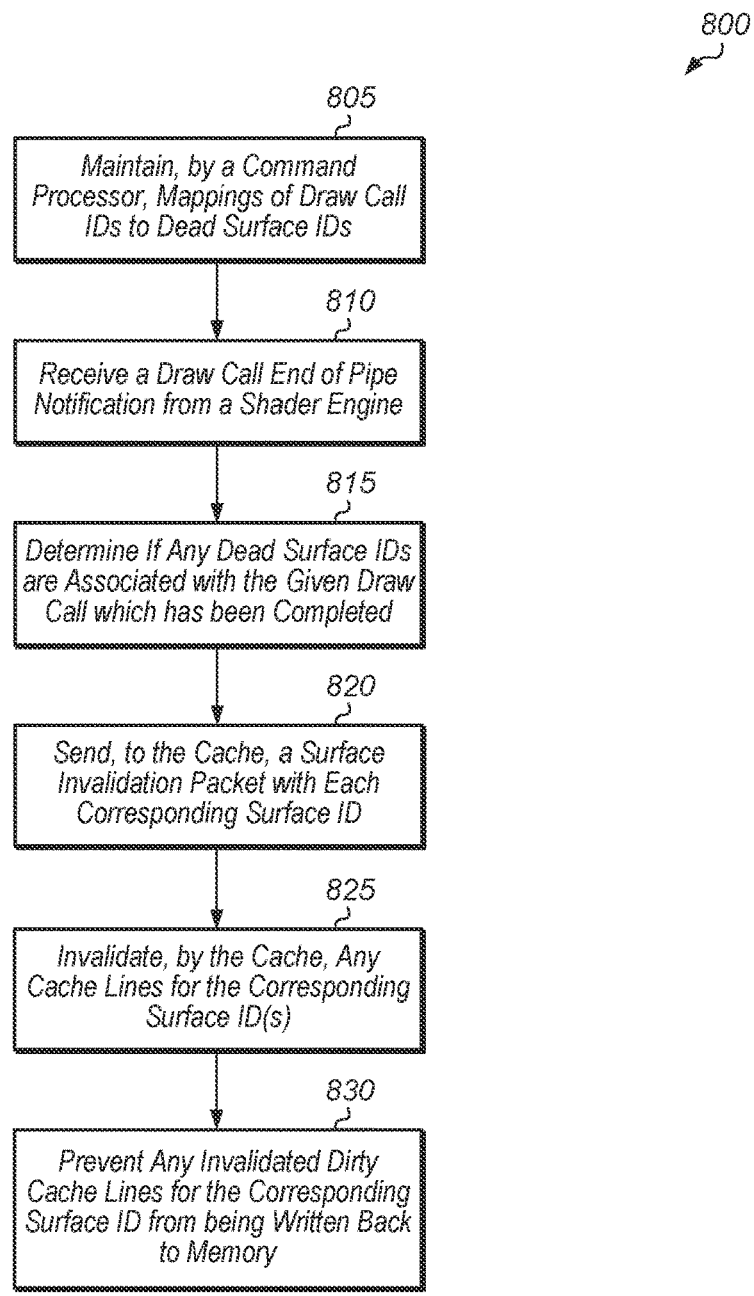
FIG. 8 is a generalized flow diagram illustrating one implementation of a method for determining which surfaces to invalidate.
Figure 9:
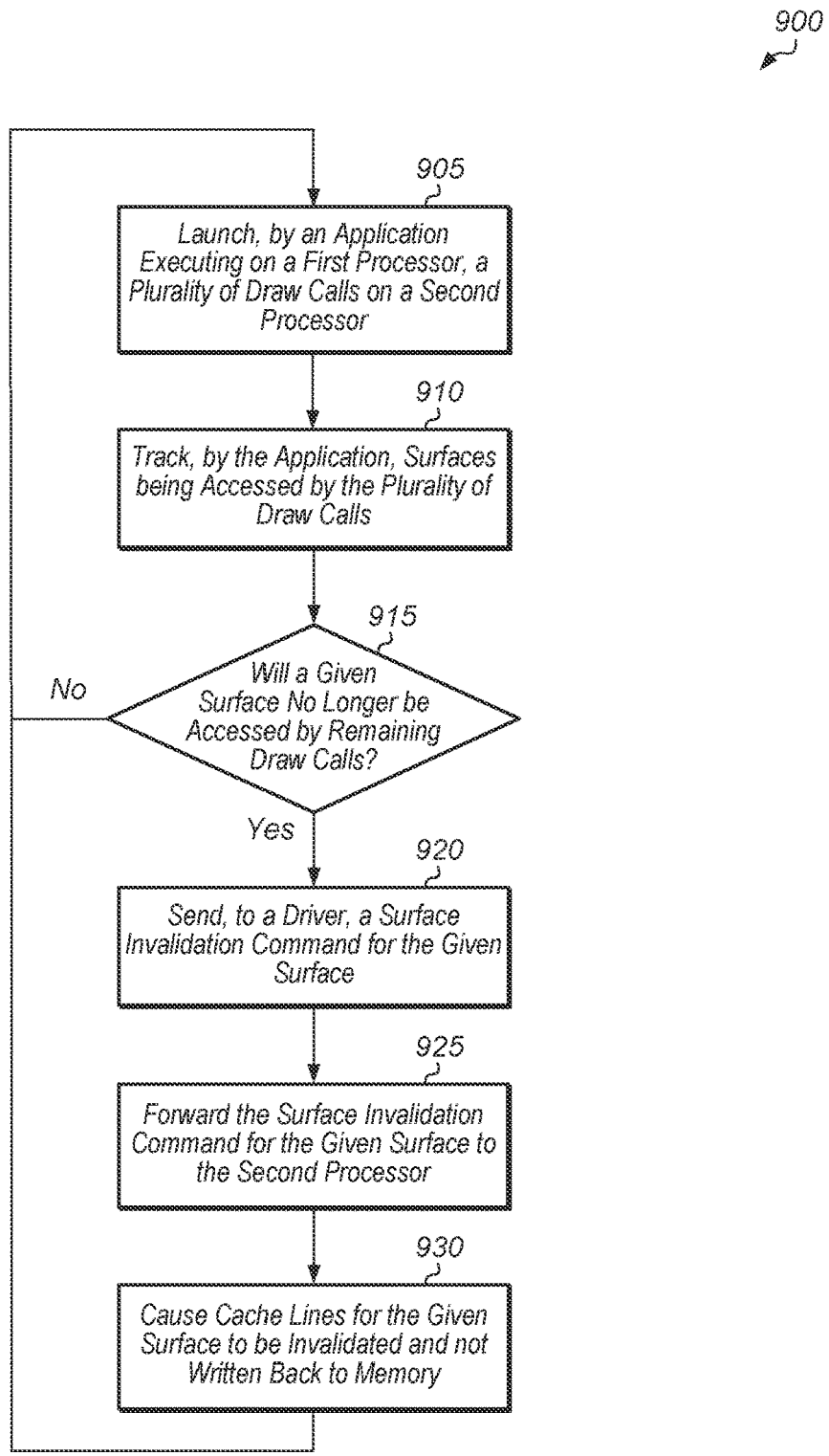
FIG. 9 is a generalized flow diagram illustrating one implementation of a method for generating a surface invalidation command.

Turning now to FIG. 6, one implementation of a method 600 for invalidating dead surfaces is shown. For purposes of discussion, the steps in this implementation and those of FIG. 7-9 are shown in sequential order. However, it is noted that in various implementations of the described methods, one or more of the elements described are performed concurrently, in a different order than shown, or are omitted entirely. Other additional elements are also performed as desired. Any of the various systems or apparatuses described herein are configured to implement method 600 (and methods 700-900).

A command processor receives a surface invalidation command corresponding to a first surface (block 605). In one implementation, the surface invalidation command identifies the first surface and a draw call ID for the last draw call which accesses the first surface. Next, the command processor adds the first surface to a list of draw ID to surface ID mappings and waits to receive an end of draw call command corresponding to the first surface (block 610). When the command processor receives the end of draw call command corresponding to the first surface (conditional block 615, "yes" leg), then the command processor conveys a surface invalidation signal to a cache, where the surface invalidation signal includes an identifier (ID) of the first surface (block 620). In response to receiving the surface invalidation signal, the cache invalidates one or more cache lines storing data of the first surface (block 625). Then, at a later point in time, the cache reuses the invalidated locations to store data of other surfaces (or data associated with other processes) (block 630). After block 630, method 600 ends.

Turning now to FIG. 7, one implementation of a method 700 for a cache controller processing an invalidate dead surface packet is shown. A cache controller receives an invalidate dead surface packet from a command processor (block 705). The cache controller retrieves a surface ID from the packet (block 710). Next, the cache controller searches for cache lines matching the surface ID retrieved from the invalidate dead surface packet (block 715). Then, the cache controller invalidates and prevents writebacks of any cache lines matching the surface ID retrieved from the invalidate dead surface packet (block 720). After block 720, method 700 ends.

Referring now to FIG. 8, one implementation of a method 800 for determining which surfaces to invalidate is shown. A command processor maintains mappings of draw call IDs to dead surface IDs (block 805). In one implementation, the command processor generates mappings of draw call IDs to dead surface IDs automatically in response to receiving draw call commands in the form of a task-graph. In another implementation, the driver conveys the draw-call-ID-to-dead-surface-ID mappings to the command processor for each dead surface that needs to be invalidated. The driver can generate these mappings through offline analysis, via discard commands generated by the application in real-time, or using any of various other techniques. At a given point in time, the command processor receives a draw call end of pipe notification from a shader engine (block 810).

When the command processor receives a draw call end of pipe notification from a shader engine, the command processor determines if there are any dead surface IDs associated with the given draw call which has been completed (block 815). In one implementation, the command processor determines if there are any dead surface IDs associated with the given draw call by searching for the ID of the given draw call in the mappings of draw call IDs to dead surface IDs. These mappings of draw call IDs to dead surface IDs are also referred to as surface ID invalidations. In one implementation, the command processor stores a surface ID invalidation in a first-in, first-out (FIFO) buffer where the invalidations are processed in the order in which they have been received. If a draw call has multiple surfaces which will become dead after the draw call is completed, the invalidation commands for these surfaces will be placed in the FIFO. The FIFO can be sized accordingly to keep receiving more such requests until their invalidation is completed. In other implementations, the command processor uses other techniques for tracking which surface IDs are to be invalidated.

Next, the command processor sends, to the cache, a surface invalidation packet with each corresponding surface ID (block 820). In response to receiving the surface invalidation packet, the cache invalidates any cache lines for the corresponding surface ID(s) (block 825). Also, the cache prevents any invalidated dirty cache lines for the corresponding surface ID from being written back to memory (block 830). After block 830, method 800 ends.

Referring now to FIG. 9, one implementation of a method 900 for generating a surface invalidation command is shown. An application executing on a first processor launches a plurality of draw calls on a second processor (block 905). In one implementation, the first processor is a CPU and the second processor is a GPU. In other implementations, the first and/or second processor can be any of various other types of processors. The application tracks surfaces being accessed by the plurality of draw calls (block 910).

When the application determines that a given surface will no longer be accessed by any remaining draw calls (conditional block 915, "yes" leg), the application sends a surface invalidation command to a driver (block 920). In one implementation, the application generates dependency graphs to determine when the given surface will no longer be accessed by any remaining draw calls. In other implementations, the application uses other techniques for determining when the given surface will not be accessed by any remaining draw calls. Next, the driver forwards the surface invalidation command for the given surface to the second processor (block 925). In response to receiving the surface invalidation command for the given surface, the second processor causes cache lines for the given surface to be invalidated and not written back to memory (block 930). After block 930, method 900 returns to block 905.

Figure 10:
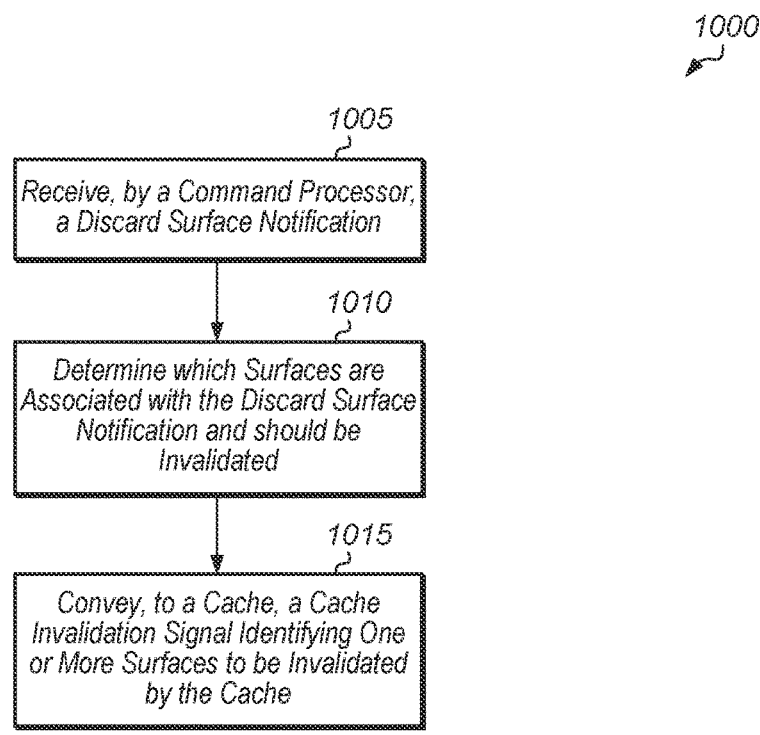
FIG. 10 is a generalized flow diagram illustrating one implementation of a method for processing a discard surface notification.

Turning now to FIG. 10, one implementation of a method 1000 for processing a discard surface notification is shown. A command processor (e.g., command processor 210 of FIG. 2) receives a discard surface notification (block 1005). In one implementation, the discard surface notification is a draw call completion notification for a particular draw call. In another implementation, the discard surface notification is a surface invalidation command identifying one or more specified surfaces. Next, the command processor determines which surfaces are associated with the discard surface notification and should be invalidated (block 1010). In one implementation, the command processor maintains a mapping of draw call IDs to dead surface IDs, and the command processor determines which surfaces should be invalidated based on the mappings and based on a given draw call being completed. In another implementation, the discard surface notification identifies the surfaces to invalidate. Then, the command processor conveys, to a cache, a cache invalidation signal identifying one or more surfaces to be invalidated by the cache (block 1015). After block 1015, method 1000 ends.

In various implementations, program instructions of a software application are used to implement the methods and/or mechanisms described herein. For example, program instructions executable by a general or special purpose processor are contemplated. In various implementations, such program instructions are represented by a high level programming language. In other implementations, the program instructions are compiled from a high level programming language to a binary, intermediate, or other form. Alternatively, program instructions are written that describe the behavior or design of hardware. Such program instructions are represented by a high-level programming language, such as C. Alternatively, a hardware design language (HDL) such as Verilog is used. In various implementations, the program instructions are stored on any of a variety of non-transitory computer readable storage mediums. The storage medium is accessible by a computing system during use to provide the program instructions to the computing system for program execution. Generally speaking, such a computing system includes at least one or more memories and one or more processors configured to execute program instructions.

It should be emphasized that the above-described implementations are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. An apparatus comprising a command processor comprising circuitry configured to:
   maintain mappings of draw call identifiers (IDs) to dead surface IDs;
   receive a discard surface notification corresponding to an end of draw pipe notification for a first draw call; and
   responsive to a determination that any surfaces associated with the discard surface notification should be invalidated, convey a cache invalidation signal identifying a first surface to a cache, responsive to the first surface being associated with the discard surface notification.

2. The apparatus as recited in claim 1, wherein the command processor is configured to determine which dead surfaces to invalidate based on which dead surface IDs have mappings from the first draw call.

3. The apparatus as recited in claim 1, wherein the discard surface notification is a surface invalidation command for the first surface, and wherein responsive to receiving the surface invalidation command for the first surface, the command processor is configured to add the first surface to a list of draw call to dead surface mappings.

4. The apparatus as recited in claim 3, wherein the surface invalidation command specifies a first draw call as a last draw call to access the first surface.

5. The apparatus as recited in claim 4, wherein the command processor is configured to convey a cache invalidation signal with IDs of the first surface and a second surface to the cache responsive to determining that the first surface and the second surface are associated with the first draw call.

6. The apparatus as recited in claim 5, wherein the command processor is configured to convey the cache invalidation signal in response to receipt of an end of draw pipe notification for the first draw call.

7. A method comprising:
   receiving, by circuitry of a command processor, a surface invalidation command for a first surface and a first draw call;
   storing a mapping of the first draw call to the first surface in a list of mappings of draw calls to dead surfaces;
   receiving, from a shader engine, an end of draw pipe notification for the first draw call;
   conveying a cache invalidation signal with an identifier (ID) of the first surface to a cache responsive to retrieving the mapping of the first draw call to the first surface; and
   invalidating, by the cache, one or more cache lines storing data of the first surface responsive to receiving the cache invalidation signal from the command processor.

8. The method as recited in claim 7, further comprising preventing, by the cache, one or more dirty cache lines from being written back to memory responsive to receiving the cache invalidation signal from the command processor.

9. The method as recited in claim 7, wherein the surface invalidation command specifies that the first draw call is a last draw call to access the first surface.

10. The method as recited in claim 7, wherein the surface invalidation command is received from a driver.

11. The method as recited in claim 7, wherein the surface invalidation command comprises a base address and a size of the first surface.

12. The method as recited in claim 7, further comprising conveying a cache invalidation signal with IDs of the first surface and a second surface to the cache responsive to determining that the first surface and the second surface correspond to the first draw call.

13. The method as recited in claim 7, further comprising generating, by the command processor, mappings of draw call IDs to dead surface IDs automatically in response to receiving draw call commands in a form of a task-graph.

14. A system comprising:
   a processor comprising circuitry configured to:
      maintain mappings of draw call identifiers (IDs) to surface IDs;
      receive a surface invalidation command for a first surface;
      detect a completion of a first draw call; and
      invalidate one or more cache lines storing data of the first surface responsive to a determination that the first surface corresponds to the first draw call.

15. The system as recited in claim 14, wherein the processor is further configured to prevent one or more dirty cache lines from being written back to memory responsive to receiving a cache invalidation signal from a command processor.

16. The system as recited in claim 14, wherein the processor is further configured to
invalidate one or more surfaces based on surface IDs of the one or more surfaces being associated with a given draw call that has completed.

17. The system as recited in claim 14, wherein the processor is further configured to:
receive a surface invalidation command for a second surface; and
invalidate one or more first cache lines storing data of the first surface and one or more second cache lines storing data of the second surface responsive to the first and second surfaces corresponding to the first draw call.

18. The system as recited in claim 14, wherein the surface invalidation command is generated for the first surface responsive to a determination that the first surface will no longer be accessed by any remaining draw calls.

19. The system as recited in claim 18, wherein surface invalidation command is inserted at a given location in a command stream of the processor, wherein the given location is subsequent to any draw calls which access the first surface.

\* \* \* \* \*